March 28, 1961  A. SMITH ET AL  2,976,663
UNDER TREE HOE MOWER
Filed April 19, 1956
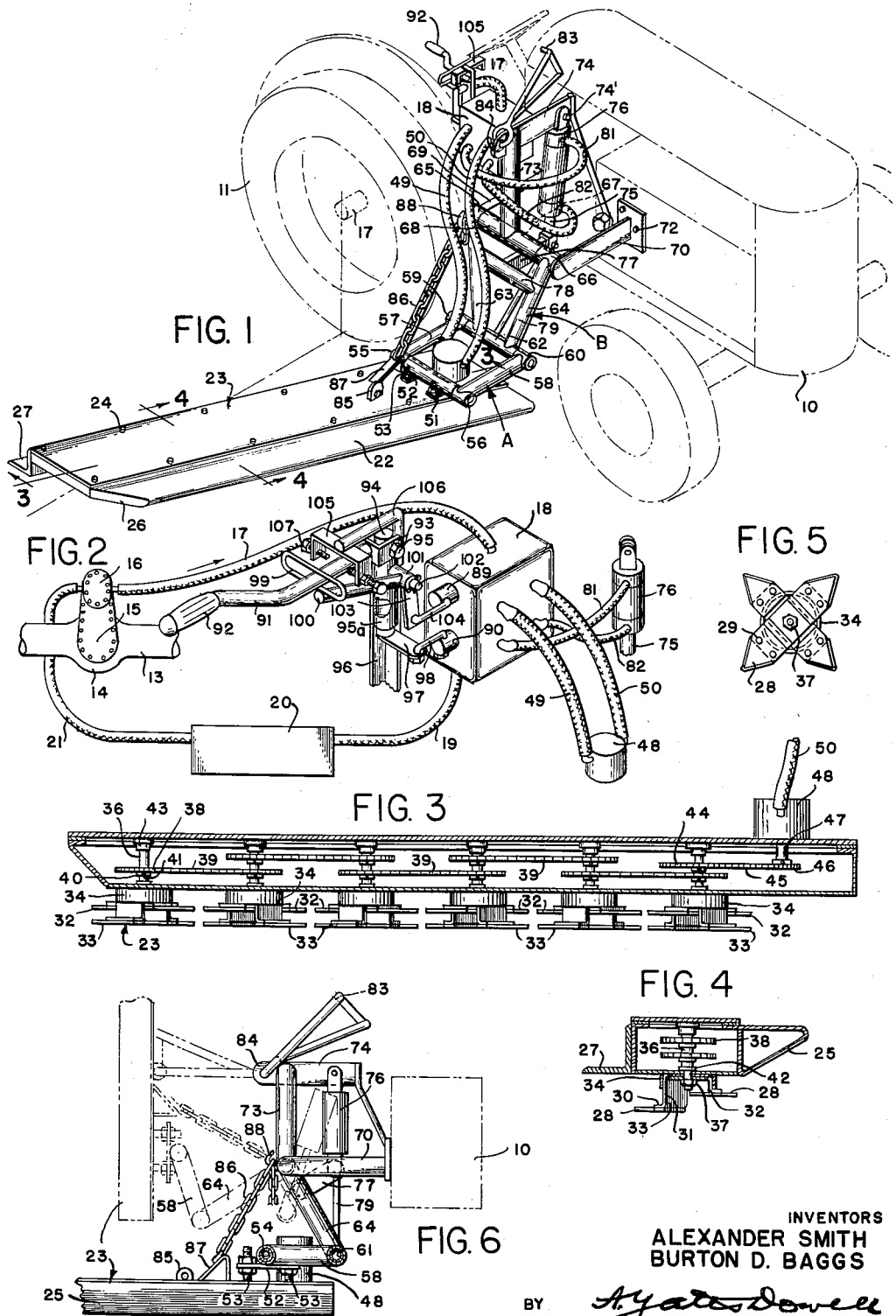
INVENTORS
ALEXANDER SMITH
BURTON D. BAGGS
BY *A. Yates Dowell*
ATTORNEY United States Patent Office 2,976,663
Patented Mar. 28, 1961

2,976,663

UNDER TREE HOE MOWER

Alexander Smith, P.O. Box 1460, and Burton D. Baggs, Jr., 2429 Laurel Ave., both of Sanford, Fla.

Filed Apr. 19, 1956, Ser. No. 579,348

6 Claims. (Cl. 56—25.4)

This invention relates to plant life, its care, cultivation and harvesting, to the clearing or removing of the same from a particular area, to the treatment of the soil to promote distribution and integration of fertilizer thereinto, and to the growth and maturity of the plants as well as to the destruction of undesirable acids, bacteria and insects injurious to the plants.

The invention relates more particularly to equipment employed in caring for extensively cultivated plant life, as for example, groves of citrus and other trees on farms and other areas where mowing and cultivation is both desirable and advantageous and consequently performed to a substantial degree.

The invention relates specifically to power-driven mowers, harvesters, and cultivators by means of which it is possible for an operator to do a great amount of work and substantially in excess of that which he normally could perform and including among other things, the treatment of relatively large areas under trees, and elsewhere, with minimum effort and expense.

In areas where citrus fruits and other products are grown, the limbs of the trees and especially those bearing the weight of fruit, hang low and substantially reach the earth. Mowing and cultivating beneath such low-hanging limbs and other fixed objects and obstructions has presented a substantial problem due to the restricted area, if injury to the trees and fruit is to be avoided. This has resulted in neglect of the area beneath the low-hanging limbs of trees permitting the growth of grass, weeds, and the like with such neglect reflected in the yield from the trees, mowers and cultivators not having been able to mow the growth and cultivate the soil beneath the low-hanging branches in order to reduce acidity as well as destroy pests and to generally promote the welfare of the trees and the yield of fruit.

The present invention is a companion application to applications No. 346,632 filed April 3, 1953, now U.S. Patent No. 2,882,978, and No. 542,897 filed October 26, 1955, now U.S. Patent No. 2,777,272, all three of which applications are directed to an attachment for a tractor including a cutter bar adapted to be pivotally mounted upon a tractor at one side in a manner to be disposed in an elevated inoperative position or in a lowered operative position but retractable while in such lowered position to avoid striking the trunk of a tree or other obstruction.

In the first filed of the three applications, when the cutter is in operative position its axis is lengthwise of the cutter bar and substantially horizontal. In the second filed application the cutter bar carries cutters which instead of having an axis disposed lengthwise of the cutter bar have a series of axes disposed transversely of the cutter bar. Also, in the second filed application the cutters are driven from the power take-off through a series of sprockets and chains with the cutter bar projectable and retractable hydraulically, and with multiple controls.

In the third filed or present application the cutters are driven hydraulically, they are reversible, and a single lever is provided for controlling the clockwise or counter-clockwise rotation of the cutters, and for the projection and retraction of the cutter bar.

It is an object of the invention to provide a relatively simple and inexpensive attachment which can be applied to a conventional tractor regardless of make, and in which a cutter bar is mounted in a manner to be raised and lowered, projected and retracted, and having cutters mounted for clockwise or counter-clockwise rotation, and all powered from the power plant of the tractor and with a single control so that an operator may steer the tractor with one hand while controlling the projection and retraction of the cutter bar and the operation of the cutters thereof with the other hand.

Another object of the invention is to provide an attachment which can be easily installed on a tractor and which attachment includes a cutter bar having one end pivoted to the side of the tractor and its other end disposed at a greater distance from the tractor substantially in line with the axis of the rear axle extended, so that a small tree or other obstruction can be closely encircled by the cutter bar with the latter following the terrain.

Another object of the invention is to provide an attachment of the character indicated mounted so that its ends may be disposed at different elevations to allow the cutter bar to follow the terrain as well as a cutter bar having cutters disposed alternately in different horizontal planes and overlapping to operate on a continuous area as well as to clean themselves, and in which the cutter bar with the cutters is projectable, and retractable for clearing an obstruction, and the power for raising and lowering the cutter bar and for driving the cutters is supplied by a pump from the power take-off of the tractor and all under the influence of a single control.

Other objects and advantages of the invention will be apparent from the following description taken in conjunction with the accompanying drawing wherein:

Fig. 1 is a perspective illustrating one application of the invention with the cutter bar in projected position;

Fig. 2, a schematic view of the hydraulic system and the one control therefor;

Fig. 3, a longitudinal vertical section on line 3—3 of Fig. 1;

Fig. 4, a transverse vertical section on line 4—4 of Fig. 1;

Fig. 5, a bottom plan view of one of the cutters; and

Fig. 6, a side elevation of the attachment installed with the cutter bar in retracted position but illustrating the same in raised inoperative position in phantom.

Briefly stated, the present invention is an attachment for installation upon a conventional tractor, and comprises an elongated cutter bar supported on the tractor by a pair of frames pivotally connected together and one each to the tractor and to the cutter bar, with means for extending such pivoted frames for projecting the cutter bar to its outermost position relative to the tractor and for retracting the cutter bar to avoid an obstruction.

A cutter bar is provided having a series of parallel transverse shafts with horizontal cutters at different elevations and in overlapping relation on their lower ends in order to provide a continuous work performing area as well as for cleaning themselves. The cutter shafts are driven one from another by a series of sprockets and chains carried in the hollow interior of the cutter bar, power for which, and for the projection and retraction of the cutter bar, being obtained from a pump driven from the power takeoff of the tractor.

A single control is provided for operating a four-way control valve which channels hydraulic fluid to motors for operating the cutters either in a clockwise or counter-clockwise direction and for swinging the frames which support the cutter bar for projecting and retracting the same.

With continued reference to the drawing, a tractor 10 includes rear wheels 11 on a rear axle 12 within an axle housing 13, the tractor having a differential 14 of conventional construction including a power takeoff with a cover 15. A hydraulic pump 16 is driven from the power takeoff and is adapted to supply hydraulic fluid through a line 17 to a four-way distributing valve 18 having a return line 19 leading to a relatively large sump or reservoir 20 from which necessary fluid is taken by a line 21. The hydraulic fluid from the four-way valve 18 is utilized for operating the necessary mechanism as will be later described.

In order to detach and remove plant life and perform such other work as is desired, a hollow elongated cutter bar 22 is provided of the desired length. The cutter bar preferably has a removable cover 23 held in place by means of bolts or other fasteners 24. The cutter bar 22 has a beveled forward or leading underface 25 and an angular corner 26 at its outer end. An angular cutter guard 27 is mounted at its rear edge to guard against detachable cutter blades 28. These cutters are fastened by bolts 29 to the horizontal flange 30 of a cup type mounting member 31 having portions 32 and 33 disposed at different elevations for cooperation within the rim of a cup 34 through which is received a cutter shaft 36 and on which the cutter is secured by means of a nut 37.

A series of cutters are provided each having four double edged blades 28, one pair of opposed blades being disposed at right angles to the other and at different elevations. A series of parallel transverse cutter shafts 36 are spaced lengthwise of the cutter bar and are provided with sprockets 38 driven by chains 39. Each sprocket is provided with a collar 40 retained on the shaft 36 by means of a set screw 41.

The shaft 36 is provided with a lower bearing 42 which receives the axial and lateral thrusts of the shaft, and at its upper end each shaft 36 is provided with a bearing 43, attached to the cover 23 of the cutter bar, so that when the cover 23 is raised the bearing will be removed from the shaft 36.

The sprockets 38 and chains 39 are staggered as shown in Fig. 3 and are driven by a sprocket 44 on the shaft 36, nearest the inner end of the cutter bar, by means of a chain 45 around a small drive sprocket 46 on the shaft 47 of a hydraulic motor 48, to which hydraulic fluid is supplied from the four-way valve 18 by means of fluid lines 49 and 50.

The cutter bar has its inner end attached to the tractor by means of a pair of pivoted frames indicated generally at A and B so that the outer or remote end of the cutter bar is in alignment with the axis of the rear axle of the tractor extended and may closely encircle an obstruction.

In order to connect the mounting frames to the cutter bar a pivot sleeve 51 is disposed substantially parallel to the side of the tractor and is provided with a pair of perforated lugs 52 for the reception of bolts 53 by means of which the pivot sleeve is attached across the inner end portion of the cutter bar 22. Within the sleeve 51 is rotatively disposed a rod or tube 54, the ends of which extend beyond the ends of the sleeve 51 and have fixed thereto sleeves 55 and 56 to which are attached substantially parallel arms or bars 57 and 58.

On the remote ends of the bars 57 and 58 are fixed sleeves 59 and 60 in which are disposed the ends of a pivot rod or tube 61 on which is received a sleeve 62. Thus the sleeves 51 and 62 can rotate one relative to the other. To the sleeve 62 are attached a pair of arms 63 and 64, the remote ends of which are spaced apart a distance somewhat more than the ends attached to the sleeve 62 in order to provide a wider, more solid base structure.

To the remote ends of the arms 63 and 64 are attached sleeves 65 and 66 rotatively mounted on a rod or tube 67 extending through an intermediate sleeve 68 located between sleeves 65 and 66 and having its extremities carried by brackets 69 and 70, the bracket 69 being attached to the tractor engine or frame by means of bolts or the like and the bracket 70 being attached to the engine by means of bolts 72.

An upright tube or support 73 is attached to the intermediate portion of the tube 68 and has a transverse plate 74 welded or otherwise secured to the same and extending from its rear side transversely of the tractor. To the plate 74 is connected by a pin 74' the piston rod 75 of a hydraulic cylinder 76. The piston rod 75 has an arm 77 connected thereto, such arm being fixed to a cross bar 78 mounted between and with its ends attached to the end portions of the arms 63 and 64 so that upon the application of force to the end of the arm 77 by means of the fluid in the cylinder 76 the bar 78 will swing the arms 63 and 64 outward. In order to aid, an additional brace 79 is connected to the sleeve 62 and to the upper inner end of the arm 77. Fluid is admitted to the upper end of the cylinder 76 by means of hydraulic line 81 and to the lower end by line 82.

A hook 83 is pivoted in an ear 84 on the plate 74 and said hook is adapted to engage a perforated lug 85 on the cutter bar for holding the latter in upright inoperative position, as for example during the time the tractor with the attachment is being moved from place to place. In order to control the elevation of the cutter bar a chain 86 is connected to a bracket 87 attached to the cutter bar and the upper end portion of said chain is adapted to be selectively engaged over a hook 88. When the length of the chain between the bracket 87 and the hook 88 is reduced to approximately one-half, the hydraulic means will cause the cutter bar 23 to be pivoted to an upright position.

It will be understood from the foregoing that the frames having the arms or side bars 57, 58, and 63, 64 which may be swung from a position in which they are collapsed or folded upon themselves to an extended position approaching a straight line and limited to a degree by the adjustment of the chain 86 which forms the third side of a triangle, the other sides being the frame with bars 57, 58 and the frame with bars 63, 64. It will also be understood that the movement of these frames is by the hydraulic cylinder 76. The cutter bar can be held at a selected elevation from the ground by suitable adjustment of the length of chain 86 between the hook 88 and the bracket 87 in conjunction with the position of the frames controlled by hydraulic cylinder 76. Further, the cutter bar can be raised to the phantom line position of Fig. 6 for transportation from one field to another or for movement along the road. To change the cutter bar from its operative position to its carrying position, the piston of the hydraulic cylinder 76 is withdrawn within the cylinder causing the frames to assume an acute angular relation and the chain 86 is then hooked to the hook 88 with a portion of the chain between hook 88 and the bracket 89 kept to a minimum length. Thereafter the cutter bar is raised to a substantially vertical position shown in phantom lines at which time the hook 83 is inserted in the perforation of the lug 85 to maintain the cutter bar in raised position thereby preventing the cutter bar from dropping over onto the tractor. The rotation of the cutters is by the motor 48, and the direction of rotation is dependent upon whether fluid passes to the motor through the hydraulic line 49 or through the hydraulic line 50.

The supply of hydraulic fluid to the lines 49 and 50 is controlled by a valve rod 89 and in like manner the flow of fluid through the lines 81 and 82 to the hydraulic cylinder 76 is governed by a control rod 90. A single control member is provided for operating the control rods 89 and 90, such control including a rod or handle 91 having a hand grip 92 at one end and a yoke 93 at its opposite extremity in which is received the upper end of a post 94, being connected thereto by means of a pivot 95. The post 94 is freely rotatable in a sleeve 95A fixed to an upstanding bracket 96, attached to the tractor 10. On the lower end of the post 94 and extending outwardly substantially at right angles thereto is fixed an arm 97 which also is disposed substantially at right angles to the arm 91. The arm 97 is connected to the valve rod 90 by means of a link 98. Thus, swinging the handle 91 sidewise will produce endwise movement of the valve rod to supply fluid for projecting and retracting the cutter bar.

On account of the pivot 95 the handle 91 can also swing in a substantially vertical plane and by such movement is adapted to engage and move an elongated link or yoke 99 which extends about the same and which is fixed to a support rod 100 connected to a mounting sleeve 101 on a pin 102, and to which mounting sleeve also is fixed an arm 103 connected at its lower end by means of a link 104 to the valve rod 89 to supply hydraulic fluid for rotating the cutters. Thus the valve control rods 89 and 90 may be operated independently or in unison by swinging the arm 91 in vertical and horizontal planes.

In order to limit the horizontal swinging of the arm 91 which operates the valve control rod 90 and the supply of fluid to the hydraulic cylinder for preventing the swinging of the cutter bar upwardly with force sufficient to strike an operator seated on the tractor, an inverted substantially U-shaped limit yoke 105 is mounted on a horizontal portion of an L-shaped bracket 106, the depending leg of which is attached to the bracket 96 or elsewhere on the tractor, and a pair of opposed adjusting screws 107 are provided one in each of the depending legs of the U-shaped member 105 so that the adjusting screws will be engaged upon the lateral movement of the arm 91 and form limit stops for the arm 91, but by swinging the arm 91 vertically these stops may be avoided.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A mower and hoe unit for attachment to a vehicle having a rear axle, a power plant having a power takeoff and a source of fluid pressure connected to said power takeoff, said unit comprising frame structure including a cutter-bar-mounting-portion movable toward and from the earth, an elongated cutter bar hinged to said cutter-bar-mounting-portion in a manner to move toward and from and to follow the contour of the earth over which the cutter travels during which its ends may be disposed at different elevations, rotary cutter means carried by said cutter bar along the same and extending to the outer end thereof, said cutter bar being disposed to an acute angle relative to the longitudinal axis of said vehicle and having its outer end located substantially in line with said axle so that said cutter bar and cutter means can be caused to travel in a substantially circular path with the outer end of said cutter means moving in a relatively small circular path and the opposite end in a substantially larger path whereby said cutter means can be operated closely around a relatively small tree or other obstruction, and means interconnecting said source of fluid pressure with said cutter bar mounting portion and said cutter means for actuating said cuter-bar-mounting-portion and said cutter means.

2. The invention according to claim 1 wherein the fluid pressure means is hydraulic and include a pump to be driven from the power takeoff of the tractor.

3. A cultivator for operating under low objects comprising a mounting vehicle having a power plant for driving the same having a power takeoff and a source of fluid pressure connected to said power takeoff, a first frame pivoted to said vehicle and constructed to be moved between raised and lowered positions, a second frame carried at the outer end of the first frame on horizontal pivot means, a rotary cutter mounted for projection and retraction on said second frame, a ground engaging member carried at one end of the second frame so that when said second frame is lowered it will accommodate itself to the terrain, and means interconnecting said source of fluid pressure with said frames and said cutter means for actuating said frames and said cutter.

4. The invention according to claim 3 wherein the fluid pressure means is hydraulic and includes a pump to be driven from the power takeoff of the tractor.

5. The invention according to claim 3 having a single control by which the projection and retraction of the cutter bar with the cutters may be accomplished and by which the cutters may be rotated in either direction.

6. The invention of claim 3 having means for holding the cutter bar in upright inoperative position.

References Cited in the file of this patent

UNITED STATES PATENTS

| | | |
|---|---|---|
| 1,397,365 | Cook | Nov. 15, 1921 |
| 1,911,516 | Landing | May 30, 1933 |
| 1,953,394 | Clapper | Apr. 3, 1934 |
| 2,165,851 | Harman | July 11, 1939 |
| 2,242,917 | Martin | May 20, 1941 |
| 2,375,970 | Williams | May 15, 1945 |
| 2,621,457 | Rosenberg | Dec. 16, 1952 |
| 2,663,133 | Davis | Dec. 22, 1953 |
| 2,670,583 | Hintz et al. | Mar. 2, 1954 |
| 2,729,044 | Dunn et al. | Jan. 3, 1956 |
| 2,743,567 | Martin | May 1, 1956 |
| 2,765,611 | King | Oct. 9, 1956 |
| 2,815,048 | Davis | Dec. 3, 1957 |